United States Patent
Guthrie et al.

(10) Patent No.: US 8,806,148 B2
(45) Date of Patent: *Aug. 12, 2014

(54) FORWARD PROGRESS MECHANISM FOR STORES IN THE PRESENCE OF LOAD CONTENTION IN A SYSTEM FAVORING LOADS BY STATE ALTERATION

(71) Applicant: International Business Machines Corporation, Armonk, NY (US)

(72) Inventors: Guy L. Guthrie, Austin, TX (US); Hien M. Le, Cedar Park, TX (US); Hugh Shen, Round Rock, TX (US); Jeff A. Stuecheli, Austin, TX (US); Derek E Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/679,351

(22) Filed: Nov. 16, 2012

(65) Prior Publication Data
US 2013/0205096 A1    Aug. 8, 2013

Related U.S. Application Data

(63) Continuation of application No. 13/368,987, filed on Feb. 8, 2012.

(51) Int. Cl.
*G06F 12/00* (2006.01)
(52) U.S. Cl.
USPC .......................................... 711/146; 711/141
(58) Field of Classification Search
USPC ........................................................ 711/146
See application file for complete search history.

(56) References Cited

U.S. PATENT DOCUMENTS

| | | | |
|---|---|---|---|
| 5,940,864 A * | 8/1999 | Arimilli et al. | 711/163 |
| 7,100,001 B2 * | 8/2006 | Edirisooriya et al. | 711/147 |
| 7,447,845 B2 * | 11/2008 | Clark et al. | 711/146 |
| 2005/0160209 A1 | 7/2005 | Van Doren et al. | |
| 2005/0240735 A1 * | 10/2005 | Shen et al. | 711/144 |
| 2006/0265466 A1 | 11/2006 | Yasui et al. | |

(Continued)

FOREIGN PATENT DOCUMENTS

EP    0923031 A1    6/1999

OTHER PUBLICATIONS

U.K. Intellectual Property Office; Application No. GB1300936.0, Combined Search and Examination Report dated Aug. 1, 2013 (5 pg.).

(Continued)

*Primary Examiner* — Charles Rones
*Assistant Examiner* — Nanci Wong
(74) *Attorney, Agent, or Firm* — Yudell Isidore Ng Russell PLLC; Matt Baca (57) ABSTRACT

A multiprocessor data processing system includes a plurality of cache memories including a cache memory. The cache memory issues a read-type operation for a target cache line. While waiting for receipt of the target cache line, the cache memory monitors to detect a competing store-type operation for the target cache line. In response to receiving the target cache line, the cache memory installs the target cache line in the cache memory, and sets a coherency state of the target cache line installed in the cache memory based on whether the competing store-type operation is detected.

4 Claims, 5 Drawing Sheets

(56) References Cited

U.S. PATENT DOCUMENTS

| | | |
|---|---|---|
| 2007/0083716 A1* | 4/2007 | Rajamony et al. ............ 711/141 |
| 2008/0215824 A1* | 9/2008 | Goodman et al. ............ 711/146 |
| 2009/0240894 A1* | 9/2009 | George et al. ................ 711/146 |
| 2010/0169579 A1* | 7/2010 | Sheaffer et al. ............... 711/141 |
| 2010/0268895 A1* | 10/2010 | Ghai et al. .................... 711/141 |
| 2013/0205099 A1* | 8/2013 | Guthrie et al. ................ 711/141 |

OTHER PUBLICATIONS

Guthrie et al. "Forward Progress Mechanism for Stores in the Presence of Load Contention in a System Favoring Loads by State Alteration", U.S. Appl. No. 13/368,987, Non-Final Office Action dated Oct. 25, 2013.

* cited by examiner

FORWARD PROGRESS MECHANISM FOR STORES IN THE PRESENCE OF LOAD CONTENTION IN A SYSTEM FAVORING LOADS BY STATE ALTERATION

This application is a continuation of U.S. patent application Ser. No. 13/368,987 entitled "FORWARD PROGRESS MECHANISM FOR STORES IN THE PRESENCE OF LOAD CONTENTION IN A SYSTEM FAVORING LOADS BY STATE ALTERATION," by Guy L. Guthrie et al., filed on Feb. 8, 2012, the disclosure of which is incorporated herein by reference in its entirety for all purposes.

BACKGROUND OF THE INVENTION

1. Technical Field

The present invention relates generally to data processing and, in particular, to servicing processor operations in a data processing system. Still more particularly, the present invention relates to dynamically adopting a coherency state of a cache line to reduce contention experienced by store-type operations.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some multiprocessor (MP) systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then access lower-level caches (e.g., level two (L2) or level three (L3) caches) for the requested memory block. The lowest level cache (e.g., L3) is often shared among several processor cores.

Because multiple processor cores may request write access to a same cache line of data and because modified cache lines are not immediately synchronized with system memory, the cache hierarchies of multiprocessor computer systems typically implement a cache coherency protocol to ensure at least a minimum level of coherence among the various processor core's "views" of the contents of system memory. In particular, cache coherency requires, at a minimum, that after a processing unit accesses a copy of a memory block and subsequently accesses an updated copy of the memory block, the processing unit cannot again access the old copy of the memory block.

A cache coherency protocol typically defines a set of coherence states stored in association with the cache lines of each cache hierarchy, as well as a set of coherency messages utilized to communicate the coherence state information between cache hierarchies. In many cases, the coherence states and state transitions of the coherence protocol are designed to favor read-type memory access operations over store-type operations. The prioritization of read-type operations over store-type operations can lead to forward progress issues for store-type operations in the presence of significant load contention.

SUMMARY OF THE INVENTION

A multiprocessor data processing system includes a plurality of cache memories including a cache memory. The cache memory issues a read-type operation for a target cache line. While waiting for receipt of the target cache line, the cache memory monitors to detect a competing store-type operation for the target cache line. In response to receiving the target cache line, the cache memory installs the target cache line in the cache memory, and sets a coherency state of the target cache line installed in the cache memory based on whether the competing store-type operation is detected.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1:
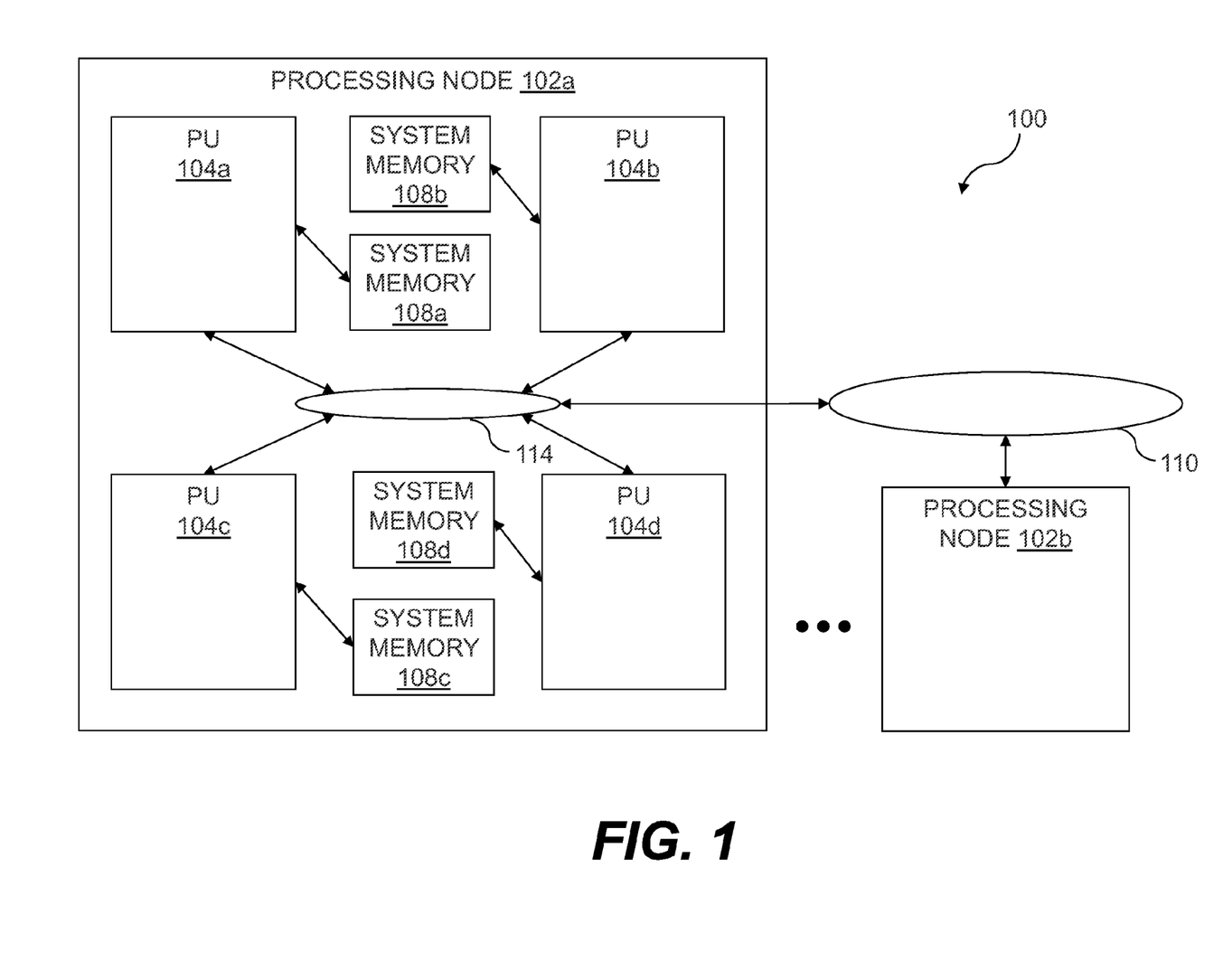
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system in accordance with one embodiment. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches.

As described below in greater detail with reference to FIG. 2, processing units 104 each include a memory controller 106 coupled to local interconnect 114 to provide an interface to a respective system memory 108. Data and instructions residing in system memories 108 can generally be accessed and modified by a processor core in any processing unit 104 of any processing node 102 within data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Figure 2:
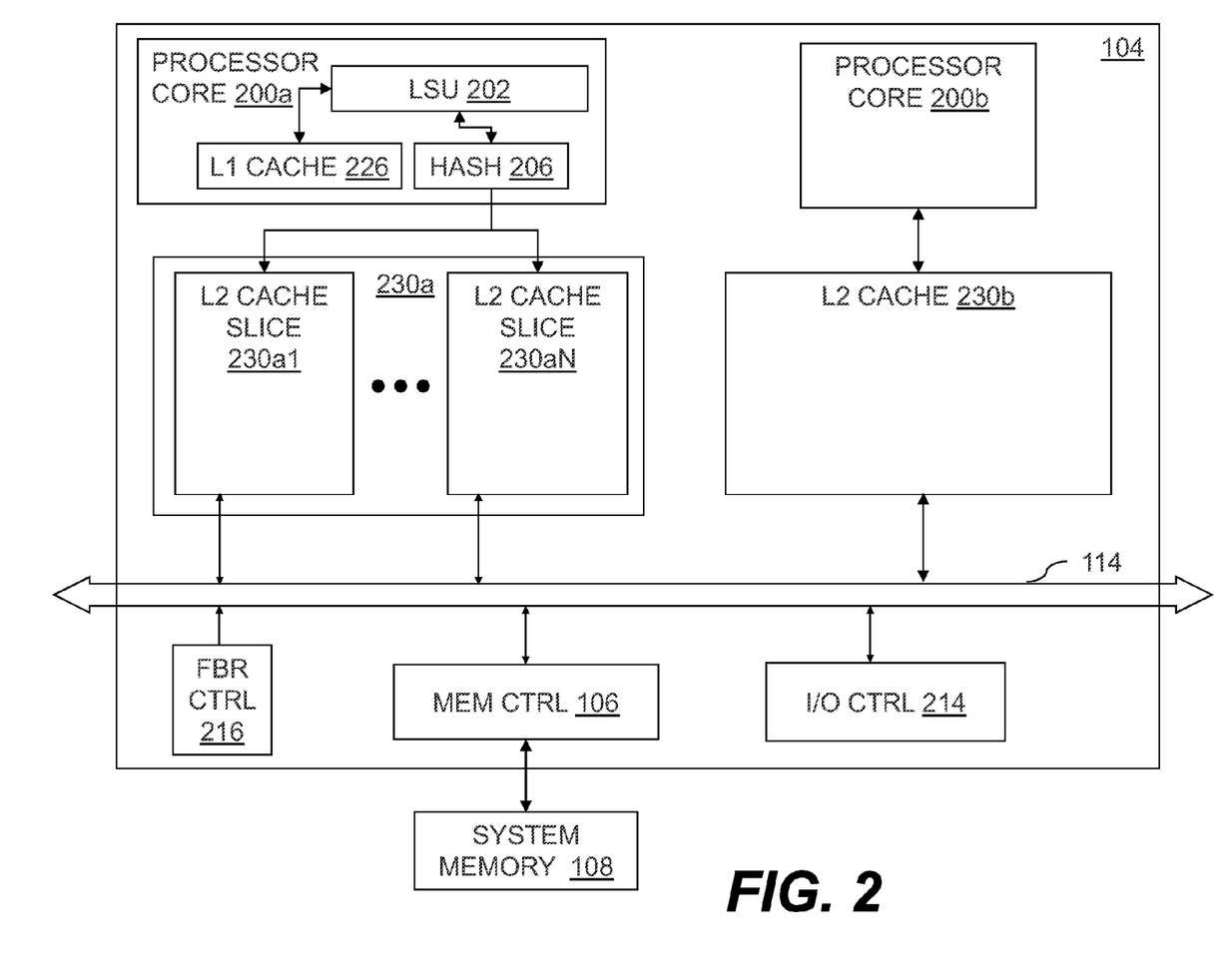
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including two processor cores 200a, 200b for processing instructions and data. In a preferred embodiment, each processor core 200 is capable of independently executing multiple hardware threads of execution simultaneously. As depicted, each processor core 200 includes one or more execution units, such as load-store unit (LSU) 202, for executing instructions. The instructions executed by LSU 202 include memory access instructions that request access to a memory block or cause the generation of a request for access to a memory block.

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 226 within and private to each processor core 200, and a respective store-in level two (L2) cache 230 for each processor core 200a, 200b. In order to efficiently handle multiple concurrent memory access requests to cacheable addresses, each L2 cache 230 can be implemented with multiple L2 cache slices 230a1-230aN, each of which handles memory access requests for a respective set of real memory addresses.

Although the illustrated cache hierarchies includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access instruction requesting a specified memory access operation to be performed, LSU 202 executes the memory access instruction to determine the target real address of the memory access request. LSU 202 then transmits to hash logic 206 within its processor core 200 at least the memory access request, which includes at least a transaction type (ttype) and a target real address. Hash logic 206 hashes the target real address to identify the appropriate destination (e.g., L2 cache slice 230a1-230aN) and dispatches the request for servicing to the appropriate destination.

Figure 3:
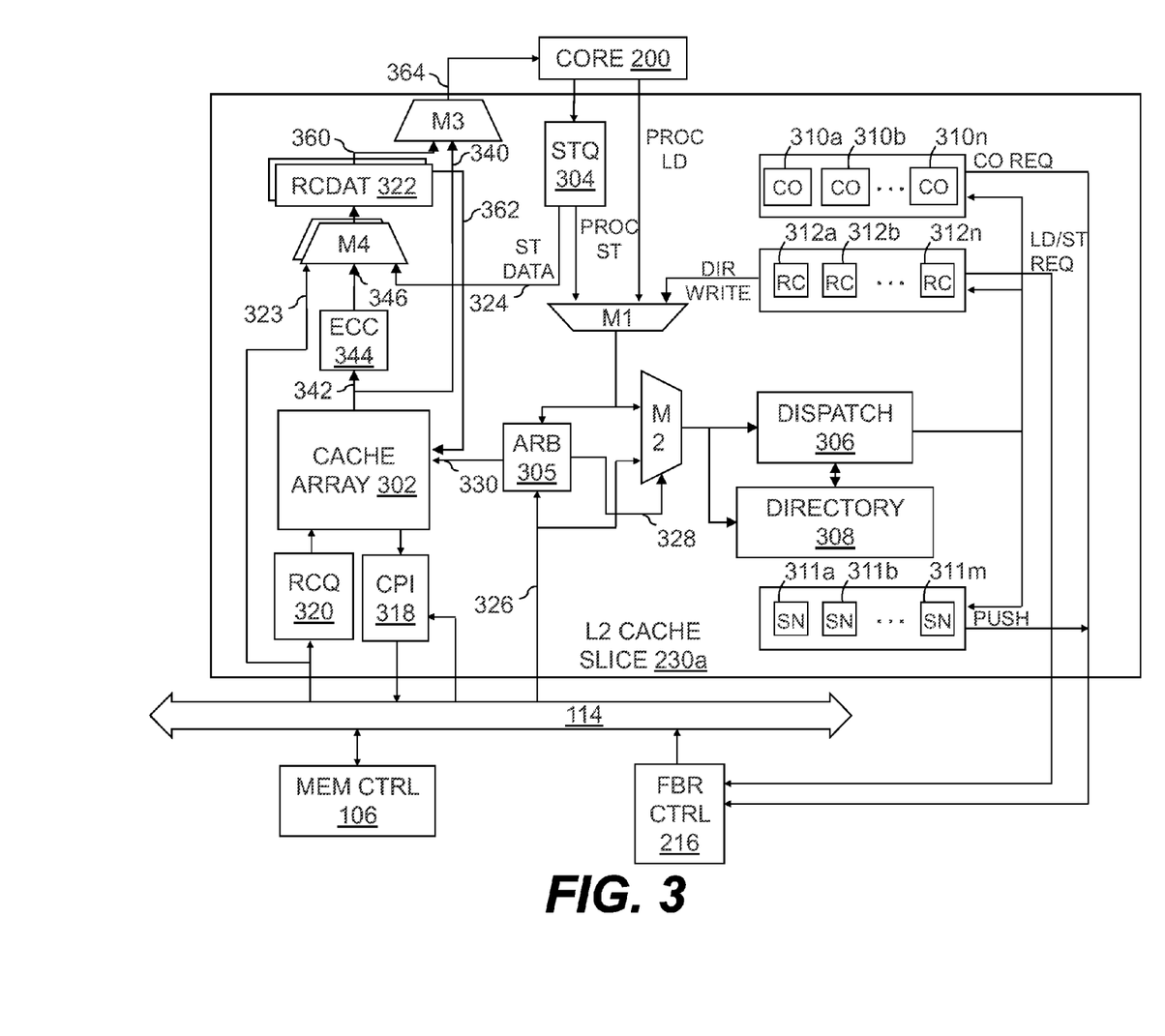
FIG. 3 is a detailed block diagram of an L2 cache slice in accordance with one embodiment.

With reference now to FIG. 3, there is illustrated a more detailed block diagram of an exemplary embodiment of one of L2 cache slice 230a1-230aN (referred to generically as L2 cache slice 230a) in accordance with one embodiment. As shown in FIG. 3, L2 cache slice 230a includes a cache array 302 and a directory 308 of the contents of cache array 302. Although not explicitly illustrated, cache array 302 preferably is implemented with a single read port and single write port to reduce the die area required to implement cache array 302.

Assuming cache array 302 and directory 308 are set associative as is conventional, memory locations in system memories 108 are mapped to particular congruence classes within cache array 302 utilizing predetermined index bits within the system memory (real) addresses. The particular memory blocks stored within the cache lines of cache array 302 are recorded in cache directory 308, which contains one directory entry for each cache line. While not expressly depicted in FIG. 3, it will be understood by those skilled in the art that each directory entry in cache directory 308 includes various fields, for example, a tag field that identifies the real address of the memory block held in the corresponding cache line of cache array 302, a state field that indicate the coherency state of the cache line, a LRU (Least Recently Used) field indicating a replacement order for the cache line with respect to other cache lines in the same congruence class, and inclusivity bits indicating whether the memory block is held in the associated L1 cache 226.

L2 cache slice 230a includes multiple (e.g., 16) Read-Claim (RC) machines 312a-312n for independently and concurrently servicing load (LD) and store (ST) requests received from the affiliated processor core 200. In order to service remote memory access requests originating from processor cores 200 other than the affiliated processor core 200, L2 cache slice 230a also includes multiple snoop machines 311a-311m. Each snoop machine 311 can independently and concurrently handle a remote memory access request "snooped" from local interconnect 114. As will be appreciated, the servicing of memory access requests by RC machines 312 may require the replacement or invalidation of memory blocks within cache array 302. Accordingly, L2 cache slice 230a includes CO (castout) machines 310 that manage the removal and writeback of memory blocks from cache array 302.

L2 cache slice 230a further includes an arbiter 305 that controls multiplexers M1-M2 to order the processing of local memory access requests received from affiliated processor core 200 and remote requests snooped on local interconnect 114. Memory access requests, including local load and store operations and remote read and write operations, are forwarded in accordance with the arbitration policy implemented by arbiter 305 to dispatch logic, such as a dispatch pipeline 306, which processes each read/load and store request is processed with respect to directory 308 and cache array 302 over a given number of cycles.

L2 cache slice 230a also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that each CO machine 310 and each snooper 311 that is dispatched retrieves data from only the respective designated CPI buffer entry.

Figure 4:
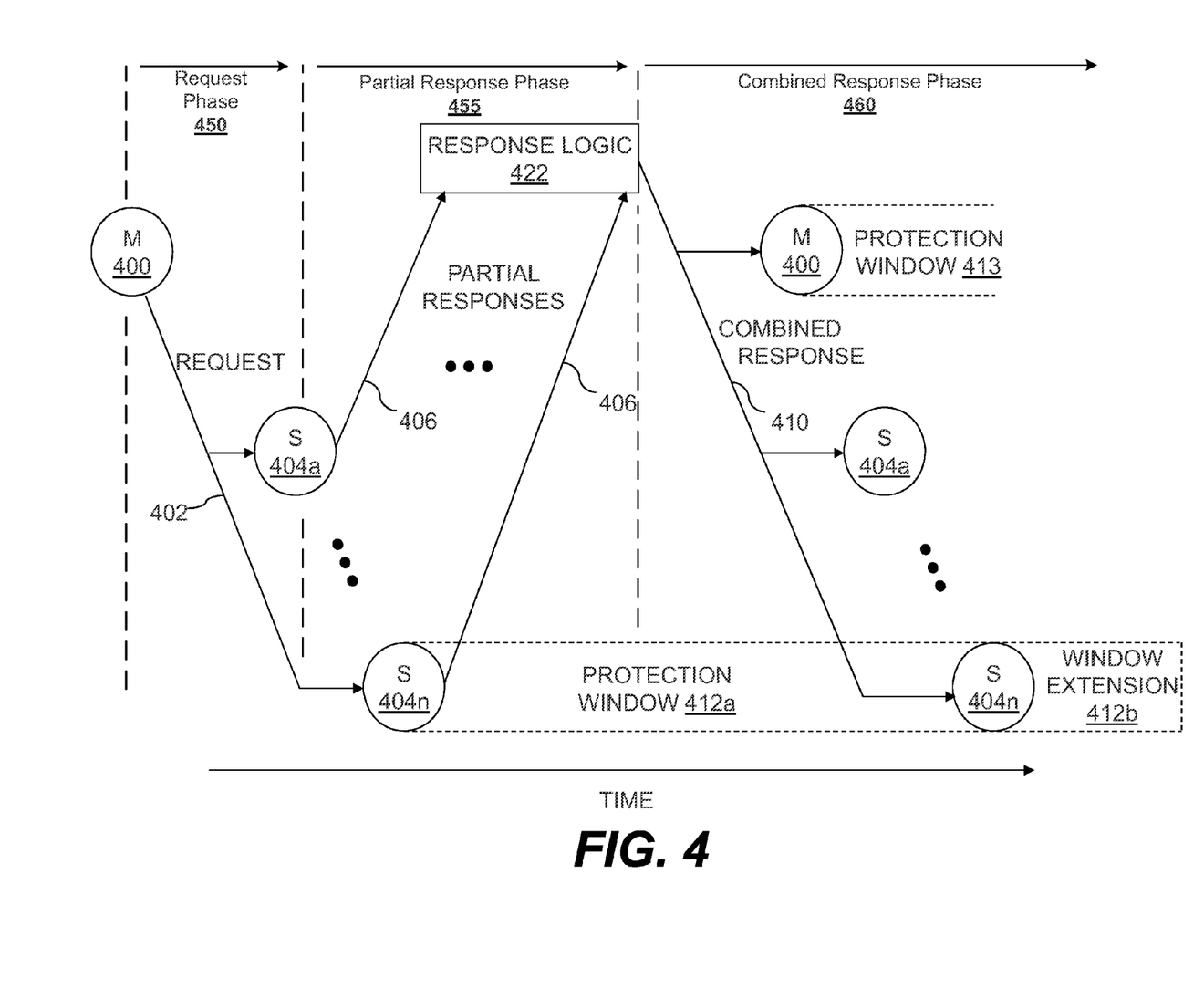
FIG. 4 is an exemplary timing diagram of the processing of a processor memory access operation in a lower level cache in accordance with one embodiment.

Referring now to FIG. 4, there is depicted a time-space diagram of an exemplary operation on the interconnect fabric of data processing system 100 of FIG. 1. The operation begins with a request phase 450 in which a master 400, for example, an RC machine 312 of an L2 cache 230, issues a request 402 on the interconnect fabric. Request 402 preferably includes at least a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |

Each RC machine 312 also has assigned to it a respective one of multiple RC data (RCDAT) buffers 322 for buffering a memory block read from cache array 302 and/or received from local interconnect 114 via reload bus 323. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, processor store requests comprising a transaction type (ttype), target real address and store data are received from the affiliated processor core 200 within a store queue (STQ) 304. From STQ 304, the store data are transmitted to store data multiplexer M4 via data path 324, and the store type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local request received from multiplexer M1 or the remote request snooped from local interconnect 114 as the next memory access request to be processed.

Request 402 is received by snoopers 404, for example, snoopers 311a-311m of L2 cache slice 230a. In general, with some exceptions, snoopers 311 in the same L2 cache 230a as the master of request 402 do not snoop request 402 (i.e., there is generally no self-snooping) because a request 402 is transmitted on the interconnect fabric only if the request 402 cannot be serviced internally by a processing unit 104.

The operation continues with a partial response phase 455. During partial response phase 455, snoopers 404 that receive and process requests 402 each provide a respective partial response 406 representing the response of at least that snooper 404 to request 402. A snooper 404 within an integrated memory controller 106 determines the partial response 406 to provide based, for example, upon whether that snooper 404 is responsible for the request address and whether it has resources available to service the request. A snooper 404 of an L2 cache 230 may determine its partial response 406 based on, for example, the availability of its L2 cache directory 308, the availability of a snoop logic instance 311 within the snooper 404 to handle the request, and the coherency state associated with the request address in L2 cache directory 308.

The operation continues with a combined response phase 460. During combined response phase 460, the partial responses 406 of snoopers 404 are logically combined either in stages or all at once by one or more instances of response logic 422 to determine a system-wide combined response (referred to herein as "CR" or "Cresp") 410 to request 402. In one preferred embodiment, which will be assumed hereinafter, the instance of response logic 422 responsible for generating combined response 410 is located in the processing unit 104 containing the master 400 that issued request 402, for example, in fabric controller 216. Response logic 422 provides combined response 410 to master 400 and snoopers 404 via the interconnect fabric to indicate the system-wide response (e.g., success, failure, retry, etc.) to request 402. If the CR 410 indicates success of request 402, CR 410 may indicate, for example, a data source for a requested memory block, a coherence state in which the requested memory block is to be cached by master 400, and whether "cleanup" operations invalidating the requested memory block in one or more L2 caches 230 are required.

In response to receipt of combined response 410, one or more of master 400 and snoopers 404 typically perform one or more operations in order to service request 402. These operations may include supplying data to master 400, invalidating or otherwise updating the coherency state of data cached in one or more L2 caches 230, performing castout operations, writing back data to a system memory 108, etc. If required by request 402, a requested or target memory block may be transmitted to or from master 400 before or after the generation of combined response 410 by response logic 422.

In the following description, the partial response 406 of a snooper 404 to a request 402 and the operations performed by the snooper 404 in response to the request 402 and/or its combined response 410 will be described with reference to whether that snooper is a Highest Point of Coherency (HPC), a Lowest Point of Coherency (LPC), or neither with respect to the request address specified by the request. An LPC is defined herein as a memory device or I/O device that serves as the ultimate repository for a memory block. In the absence of a caching participant that holds a copy of the memory block, the LPC holds the only image of that memory block. In the absence of an HPC caching participant for the memory block, the LPC has the sole authority to grant or deny requests to modify the memory block. In addition, an LPC, when the LPC data is current and in the absence of a caching participant that can provide the data, provides that data to requests to either read or modify the memory block. If a caching participant has a more current copy of the data, but is unable to provide it to a request, the LPC does not provide stale data and the request is retried. For a typical request in the data processing system embodiment, the LPC will be the memory controller 106 for the system memory 108 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC (even if its copy is consistent with main memory behind the LPC) also provides a copy of the memory block to a requestor in response to any request to read or modify the memory block (cache to cache transfers are faster than LPC to cache transfers). Thus, for a typical request in the data processing system embodiment, the HPC, if any, will be an L2 cache 230. Although other indicators may be utilized to designate an HPC for a memory block, a preferred embodiment designates the HPC, if any, for a memory block utilizing selected cache coherency state(s) within the L2 cache directory 308 of an L2 cache 230. In a preferred embodiment, the coherency states within the coherency protocol, in addition to providing (1) an indication of whether a cache is the HPC for a memory block, also indicate (2) whether the cached copy is unique (i.e., is the only cached copy system-wide), (3) whether and when the cache can provide a copy of the memory block to a master of a request for the memory block, and (4) whether the cached image of the memory block is consistent with the corresponding memory block at the LPC (system memory). These four attributes can be expressed, for example, in an exemplary variant of the well-known MESI (Modified, Exclusive, Shared, Invalid) protocol summarized below in Table II. Further information regarding the coherency protocol may be found, for example, in U.S. Pat. No. 7,389,388, which is hereby incorporated by reference.

TABLE II

| Coherence state | HPC? | Unique? | Data source? | Consistent with LPC? | Legal concurrent states |
|---|---|---|---|---|---|
| M | yes | yes | yes, before CR | no | I (& LPC) |
| Me | yes | yes | yes, before CR | yes | I (& LPC) |
| T, Te | yes | unknown | yes, after CR if none provided before CR | no | $S_L$, S, I (& LPC) |
| $S_L$ | no | unknown | yes, before CR | unknown | T, S, I (& LPC) |
| S | no | unknown | no | unknown | T, $S_L$, S, I (& LPC) |
| I | no | n/a | no | n/a | M, Me, T, $S_L$, S, I (& LPC) |

Of note in Table II above are the T, $S_L$ and S states, which are all "shared" coherency states in that a cache memory may contemporaneously hold a copy of a cache line held in any of these states by another cache memory. The T or Te state identifies an HPC cache memory that formerly held the associated cache line in one of the M or Me states, respectively, and sourced a query-only copy of the associated cache line to another cache memory. As an HPC, a cache memory holding a cache line in the T or Te coherence state has the authority to modify the cache line or to give such authority to another cache memory. A cache memory holding a cache line in the Tx state (e.g., T or Te) serves as the cache data source of last resort (after Cresp) for query-only copies of that cache line in that the cache memory will only source a query-only copy to another cache memory if no cache memory holding the cache line in the $S_L$ state is available to serve as a data source (before Cresp).

The $S_L$ state is formed at a cache memory in response to that cache memory receiving a query-only copy of a cache line from a cache memory in the T coherence state. Although the $S_L$ state is not an HPC coherence state, a cache memory holding a cache line in the $S_L$ state has the ability to source a query-only copy of that cache line to another cache memory and can do so prior to receipt of Cresp. In response to sourcing a query-only copy of a cache line to another cache memory (which assumes the $S_L$ state), the cache memory sourcing the query-only copy of the cache line updates its coherency state for the cache line from $S_L$ to S. Thus, implementation of the $S_L$ coherence state can cause numerous query-only copies of frequently queried cache lines to be created throughout a multiprocessor data processing system, advantageously decreasing latencies of query-only access to those cache lines.

Referring again to FIG. 4, the HPC, if any, for a memory block referenced in a request 402, or in the absence of an HPC, the LPC of the memory block, preferably has the responsibility of protecting the transfer of ownership of a memory block, if necessary, in response to a request 402. In the exemplary scenario shown in FIG. 4, a snooper 404n at the HPC (or in the absence of an HPC, the LPC) for the memory block specified by the request address of request 402 protects the transfer of ownership of the requested memory block to master 400 during a protection window 412a that extends from the time that snooper 404n determines its partial response 406 until snooper 304n receives combined response 410 and during a subsequent window extension 412b extending a programmable time beyond receipt by snooper 404n of combined response 410. During protection window 412a and window extension 412b, snooper 404n protects the transfer of ownership by providing partial responses 406 to other requests specifying the same request address that prevent other masters from obtaining ownership (e.g., a retry partial response) until ownership has been successfully transferred to master 400. Master 400 likewise initiates a protection window 413 to protect its ownership of the memory block requested in request 402 following receipt of combined response 410.

Because snoopers 404 all have limited resources for handling the CPU and I/O requests described above, several different levels of partial responses and corresponding CRs are possible. For example, if a snooper within a memory controller 106 that is responsible for a requested memory block has a queue available to handle a request, the snooper may respond with a partial response indicating that it is able to serve as the LPC for the request. If, on the other hand, the snooper has no queue available to handle the request, the snooper may respond with a partial response indicating that it is the LPC for the memory block, but is unable to currently service the request. Similarly, a snooper 311 in an L2 cache 230 may require an available instance of snoop logic and access to L2 cache directory 406 in order to handle a request. Absence of access to either (or both) of these resources results in a partial response (and corresponding CR) signaling an inability to service the request due to absence of a required resource.

As discussed above, read-type operations are generally prioritized over store-type operations in data processing systems because the time critical path through a software program is generally determined by load latency. The prioritization of read-type operations over store-type operations can be expressed in a number of data processing system attributes, including the hardware architecture, memory model and coherency protocol implemented by a given data processing system. For example, the coherency protocol summarized in Table II reflects this prioritization by favoring the formation of numerous distributed query-only ($S_L$ or S) copies of a frequently queried cache line throughout a multiprocessor data processing system. While the availability of numerous sources of a query-only copy of a cache line reduces access latency of non-storage-modifying operations, the presence of many copies of the cache line distributed throughout the data processing system can increase the access latency of storage-modifying accesses because any one of the cache memories holding a query-only copy of the cache line and servicing a request for query-only access can force a competing request for storage-modifying access to be retried. In certain cases, repeated retry of the storage-modifying access can slow or even halt forward progress of the program (e.g., if the storage-modifying access is required to release a highly contended lock).

As described in detail below with reference to FIG. 5, performance issues associated with read prioritization can be addressed by reducing contention experienced by store-type operations for selected memory blocks. In particular, contention for store-type operations in a data processing system can be reduced by limiting the replication of shared copies of a cache line that is the target of competing read-type and store-type operations throughout the system by setting the coherence state of the cache line to a coherence state that indicates that cache memory holding the cache line cannot source additional copies of the cache line to other requestors. By reducing the replication of additional copies of the cache line, the probability that a store-type operation targeting the cache line will be forced to be retried by a snooping cache memory is also reduced.

Figure 5:
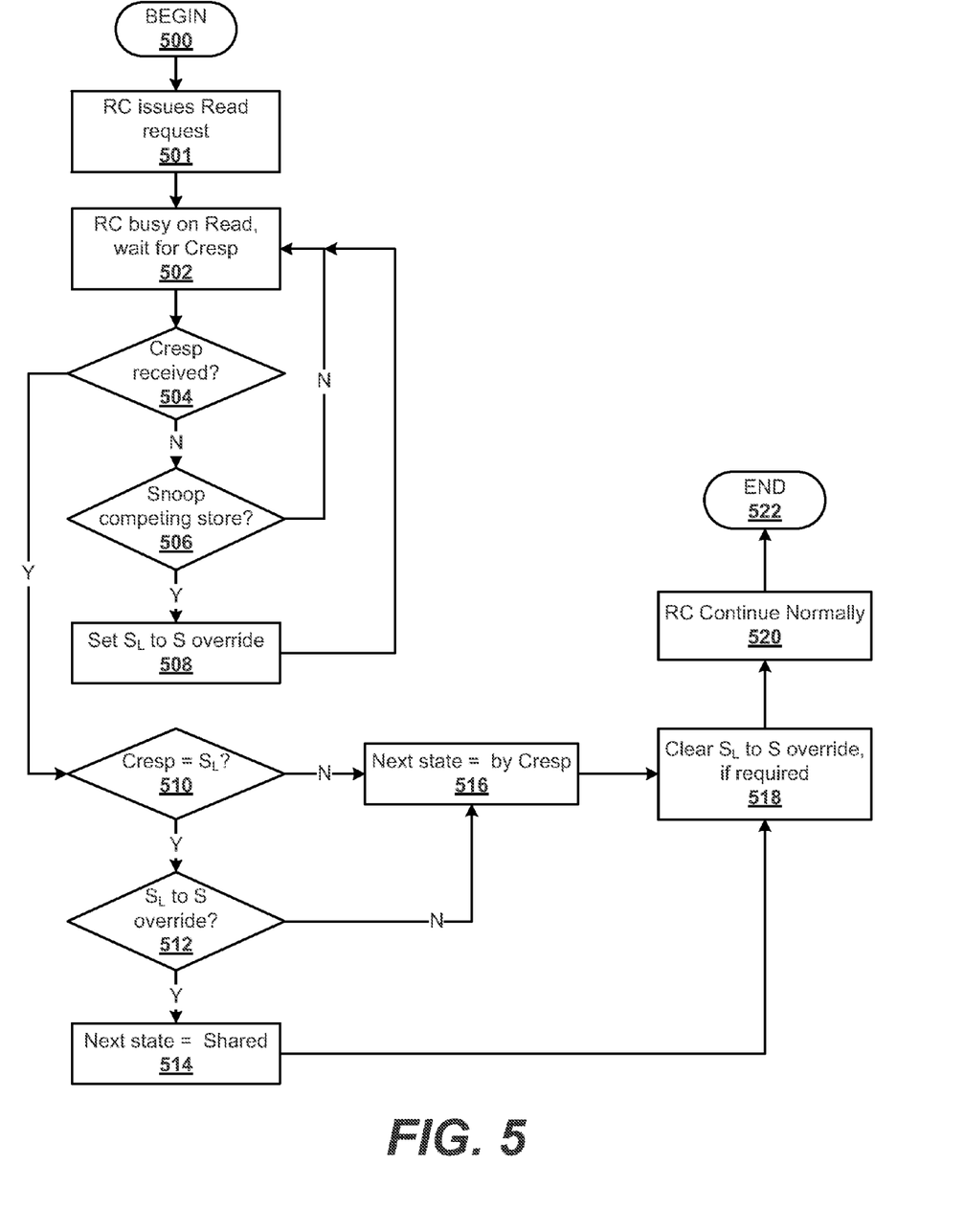
FIG. 5 is a high level logical flowchart of an exemplary process of servicing a processor memory access operation in accordance with one embodiment.

Turning now to FIG. 5, there is illustrated a high level logical flowchart of an exemplary process by which a cache memory dynamically sets a coherence state for a cache line that is the target of competing read-type and store-type operations to limit replication of additional copies of the cache line. For clarity, the description of the flowchart will occasionally refer back to FIGS. 1-4.

The process depicted in FIG. 5 begins at block 500 and then proceeds to block 501, which illustrates an RC machine 312 in an L2 cache memory 230 issuing a read-type request on local interconnect 114, for example, in response to a processor load request that misses in directory 308. The read-type operation may be a READ request as previously described or any other non-storage-modifying access to a target cache line. As depicted at block 502, while RC machine 312 awaits receipt of the combined response for its read-type request, RC machine 312 remains in a busy state. As described above with reference to FIG. 4, the read-type request is received by snoopers 404, each of which provides to response logic 422 a Presp indicating the ability of that snooper 404 to service the read-type request. Response logic 422 generates a Cresp from the Presps received from snoopers 404 and provides the Cresp to the RC machine 312 and snoopers 404. The Cresp may designate, for example, a data source that will supply the requested (target) cache line to the requesting L2 cache memory 230 and a coherence state to be associated with the cache line at the requesting L2 cache memory 230.

In response to the RC machine 312 detecting a Cresp for the read-type request, the process proceeds to block 510, which is described below. While the Cresp has not yet been received, the RC machine 312 monitors to detect any competing store-type operation (i.e., any storage-modifying operation) directed to the same target cache line as the read-type request (block 506). If not such competing store is detected the process continues at block 502, which has been described. Otherwise, if a competing store-type operation is detected at block 506 before a Cresp is received at block 504, then the process continues at block 508.

At block 508, RC machine 312 sets an override flag to indicate that if an $S_L$ coherence state is designated by the forthcoming Cresp, the designated $S_L$ state should be overridden and an S coherence state should instead be associated with the target cache line at the requesting L2 cache 230. More generally, RC machine 312 sets a flag to be prepared to override any designated coherence state that indicates that its L2 cache memory 230 is permitted to source copies of the target cache line to future requestors with a substitute coherence state that indicates that a cache line may not source copies of the target cache line to future requestors. Holding the cache line in a coherence state that indicates that the L2 cache memory 230 cannot source copies of the cache line to requestors potentially reduces the number of shared cache snoopers that may intervene data before Cresp to future requests and potentially cause the HPC cache to serve as an intervention data source of last resort. Following block 508, the process returns to block 502, which has been described.

Referring now to block 510, RC machine 312 determines whether or not the coherence state designated for the requested cache line would allow the L2 cache memory 230 to source the cache line to future requestors before Cresp (e.g., is the $S_L$ state). If the Cresp does not designate a coherence state that would allow the requesting L2 cache memory 230 to source the cache line to such future requestors, then RC machine 312 updates the entry in directory 308 corresponding to the target cache line to the coherence state indicated by the Cresp (block 516). Thereafter, the process passes to block 518, which depicts RC machine 312 clearing the override flag, if required. After block 518, the process continues at block 520, and the RC machine 312 continues to process the read-type operation normally. For example, at block 520, the RC machine 312 installs the target cache line received in response to the read-type request in cache array 302. Following block 520, the RC machine 312 returns to an idle state, and the process ends at block 522.

Returning to block 510, if the Cresp designates a coherence state for the requested cache line that indicates that the L2 cache memory 230 would be permitted to source a copy of the target cache line to another requestor (e.g., $S_L$), the process continues at block 512. At block 512, RC machine 312 determines whether the override flag was set at block 508. However, in some instances, block 508 will never be reached and, thus, the override flag will never be set. If, at block 512, the RC machine 312 determines the override flag was not set, then the process continues at block 516, which is described above. If, RC machine 312 determines at block 512 that the override flag was set, then the process continues at block 514, which illustrates the RC machine 312 setting the entry in directory 308 to a state that indicates that the L2 cache memory 230 cannot source copies of the cache line to requestors, for example, the Shared state. The process continues at block 518, which has been described above.

As has been described, a multiprocessor data processing system includes a plurality of cache memories including a cache memory. The cache memory issues a read-type operation for a target cache line. While waiting for receipt of the target cache line, the cache memory monitors to detect competing store-type operation for the target cache line. In response to receiving the target cache line, the cache memory installs the target cache line in the cache memory, and sets a coherency state of the target cache line installed in the cache memory based on whether the competing store-type operation is detected.

While various embodiments have been particularly shown and described, it will be understood by those skilled in the art that various changes in form and detail may be made therein without departing from the spirit and scope of the appended claims and these alternate implementations all fall within the scope of the appended claims.

What is claimed is:

1. A method in a multiprocessor data processing system including a plurality of cache memories including a cache memory, the method comprising:

in response to a read-type request of an associated processor core, issuing, by the cache memory, a read-type operation for a target cache line;

while servicing the read-type request, monitoring, by the cache memory, to detect receipt of a competing store-type operation for the target cache line;

in response to receiving the target cache line of the read-type operation:

installing the target cache line in a data array of the cache memory and, in a directory of the cache memory, setting a state field associated with the target cache line to a selected initial coherence state among multiple possible initial coherence states based on whether the competing store-type operation is detected while servicing the read-type request, wherein the setting includes:

selecting, as the initial coherence state, a first coherence state that designates the cache memory as a source of copies of the target cache line in response to not detecting a competing store-type operation while servicing the read-type request; and selecting, as the initial coherence state, a different second coherence state that does not designate the cache memory as a source of copies of the target cache line in response to detecting a competing store-type operation while servicing the read-type request.

2. The method of claim 1, further comprising:

the cache memory receiving a coherence message of the read-type operation that indicates the first coherence state.

3. The method of claim 2, wherein the coherence message is a combined response message representing a system-wide response to the read-type operation.

4. The method of claim 1, wherein the first and second coherence states both indicate that the target cache line is unmodified and possibly shared by multiple cache memories.

\* \* \* \* \*